US 12,449,406 B2

(12) United States Patent
Ariki et al.

(10) Patent No.: US 12,449,406 B2
(45) Date of Patent: Oct. 21, 2025

(54) ULTRASONIC TESTER

(71) Applicant: KAWASAKI JUKOGYO KABUSHIKI KAISHA, Kobe (JP)

(72) Inventors: Ryosuke Ariki, Kobe (JP); Katsumi Nagata, Kobe (JP); Kenji Tsubaki, Kobe (JP); Toshihiro Yamaoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 339 days.

(21) Appl. No.: 18/129,900

(22) Filed: Apr. 3, 2023

(65) Prior Publication Data

US 2023/0266276 A1 Aug. 24, 2023

Related U.S. Application Data

(63) Continuation of application No. PCT/JP2021/035301, filed on Sep. 27, 2021.

(30) Foreign Application Priority Data

Oct. 6, 2020 (JP) .................. 2020-169243

(51) Int. Cl.
*G01N 29/28* (2006.01)

(52) U.S. Cl.
CPC ..... *G01N 29/28* (2013.01); *G01N 2291/0289* (2013.01)

(58) Field of Classification Search
None
See application file for complete search history.

(56) References Cited

U.S. PATENT DOCUMENTS

| | | | |
|---|---|---|---|
| 6,344,740 B1* | 2/2002 | Haberlein | B65H 57/12 |
| | | | 324/226 |
| 10,209,228 B2 | 2/2019 | Oono et al. | |
| 2004/0211261 A1 | 10/2004 | Prause | |
| 2005/0068041 A1* | 3/2005 | Kress | G01N 29/2475 |
| | | | 324/534 |
| 2011/0030477 A1 | 2/2011 | Cousins | |
| 2018/0340914 A1 | 11/2018 | Lim et al. | |

FOREIGN PATENT DOCUMENTS

JP 2016-080405 A 5/2016

* cited by examiner

*Primary Examiner* — Suman K Nath
(74) *Attorney, Agent, or Firm* — XSENSUS LLP

(57) ABSTRACT

An ultrasonic tester includes an ultrasonic sensor that applies ultrasound to a test object; a casing that holds the ultrasonic sensor immersed in a contact medium that allows the ultrasound to propagate therethrough, the casing including a test object-facing opening Further, there is circuitry configured to, when the test object-facing opening of the casing is passing an opening of the test object in a test direction of the test object, control a moving speed of the casing such that a region of contact between the test object and the contact medium entering the opening of the test object is kept within the opening of the test object.

20 Claims, 4 Drawing Sheets

ULTRASONIC TESTER

CROSS-REFERENCE TO RELATED APPLICATION

The present application is a bypass continuation of PCT Filing PCT/JP2021/035301, filed Sep. 27, 2021, which claims priority to JP 2020-169243, filed Oct. 6, 2020, both of which are incorporated by reference in their entirety.

BACKGROUND ART

1. Field of the Application

The present disclosure relates to an ultrasonic tester that performs ultrasonic flaw detection on test objects.

2. Description of the Related Art

Conventional techniques for detecting flaws in test objects include testing by a through-transmission method or pulse-echo method, for example, local immersion method, using an ultrasonic tester. In the through-transmission testing, the ultrasound transmitted through the test object is received, and whether the test object has a flaw is determined based on the energy of the received ultrasound. In the pulse-echo testing, the ultrasound reflected from the test object is received, and whether the test object has a flaw is determined based on the energy of the received ultrasound.

For example, there is a known ultrasonic tester. This ultrasonic tester employs the pulse-echo method to detect a flaw in a test object which is a composite material forming an aircraft wing. In the ultrasonic tester, water is supplied to a water storage chamber by a water supply pump. Once the water storage chamber becomes full and the water begins to be discharged out of the chamber through an opening, an ultrasonic sensor emits ultrasound toward the opening. After that, the ultrasound hits the test target surface of the test object and propagates through the test object. Once the ultrasound reaches a flaw inside the test object or reaches the surface opposite to the test target surface, an ultrasound echo is generated, and the ultrasound echo is received by the ultrasonic sensor.

A kind of test object has an opening in its surface. In ultrasonic flaw detection using the pulse-echo method, if water exists behind that surface of the test object which is subjected to the flaw detection, the intensity of the received ultrasound echo is reduced, and it is difficult to obtain good-quality flaw detection data. Thus, conventionally, a seal is attached to the opening, or a jig is fitted into the opening to prevent water from residing behind the part subjected to the flaw detection.

SUMMARY

An ultrasonic tester of the present disclosure applies ultrasound to a test object having an opening to detect whether the test object has a flaw. There is an ultrasonic sensor that applies the ultrasound to the test object, and a casing that holds the ultrasonic sensor immersed in a contact medium that allows the ultrasound to propagate therethrough, the casing including a test object-facing opening. Further, there is circuitry configured to, when the test object-facing opening of the casing is passing an opening of the test object in the test direction of the test object, control a moving speed of the casing such that a region of contact between the test object and the contact medium entering the opening of the test object is kept within the opening of the test object.

The circuitry controls the moving speed of the casing moved by the mover such that a region of contact between the test object and the contact medium entering the opening of the test object is kept within the opening of the test object.

The disclosure also includes a method of testing. In the method, there is a sensing of a test object through an opening of a casing, the casing holding a contact medium. Further, the method controls a moving speed of the casing such that a region of contact between the test object and the contact medium entering an opening of the test object is kept within the opening of the test object.

DESCRIPTION OF THE PREFERRED EMBODIMENTS

Hereinafter, an ultrasonic tester according to an exemplary embodiment of the present disclosure will be described with reference to the drawings. The ultrasonic tester described below is merely an embodiment of the present disclosure. The present disclosure is not limited to the embodiment described below, and additions, deletions, and changes may be made without departing from the gist of the present disclosure.

Figure 1:
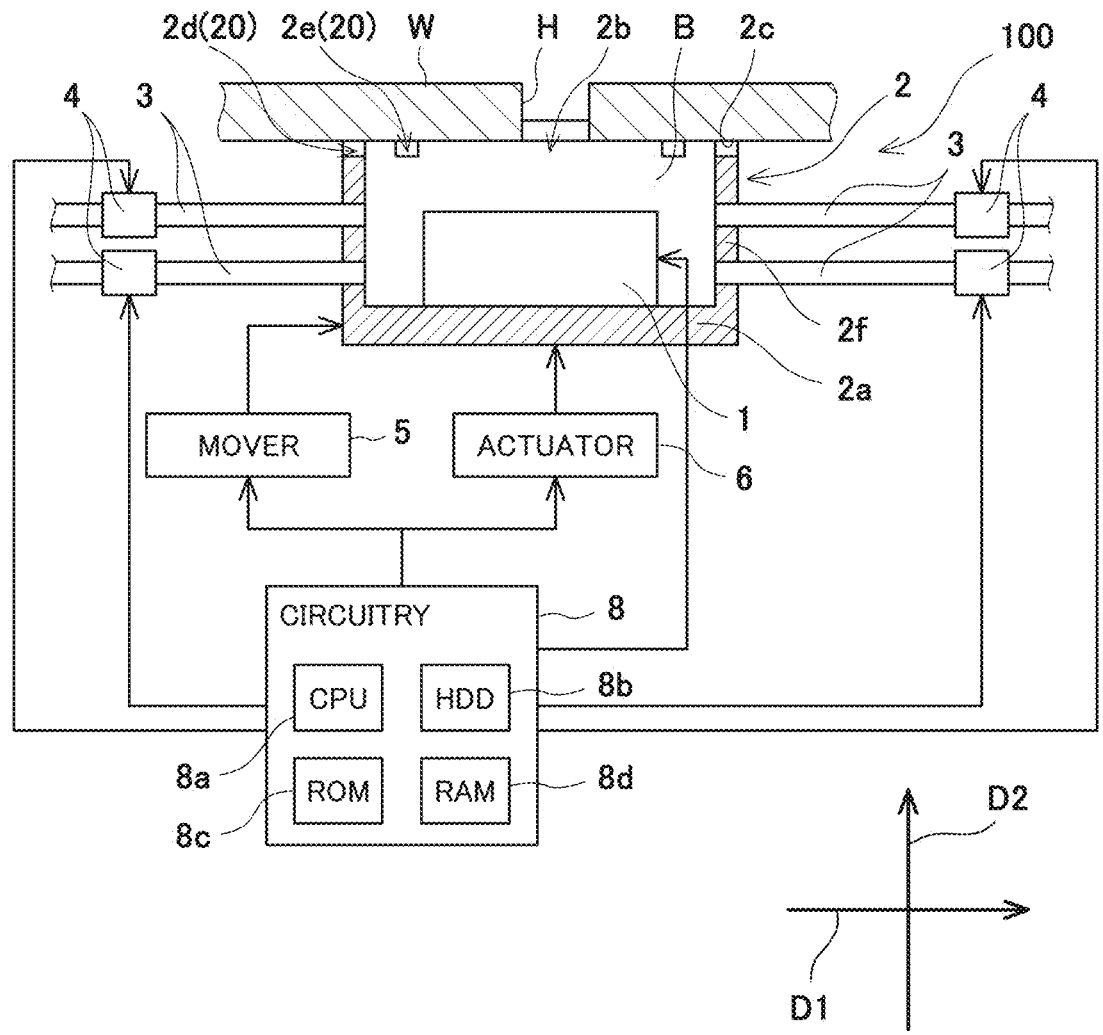
FIG. 1 is a cross-sectional view showing the configuration of an ultrasonic tester according to an exemplary embodiment of the present disclosure.

FIG. 1 is a cross-sectional view showing the configuration of an ultrasonic tester 100 according to an exemplary embodiment of the present disclosure. The ultrasonic tester 100 of FIG. 1 performs flaw detection by a so-called pulse-echo method, for example, local immersion method, which consists of receiving ultrasound reflected from a test object and determining whether the test object has a flaw based on the energy of the received ultrasound. The following describes the ultrasonic tester 100 of this exemplary embodiment in detail.

As shown in FIG. 1, the ultrasonic tester 100 of this exemplary embodiment includes an ultrasonic sensor 1, a casing 2, at least one supply pipe 3, at least one valve 4, a mover 5, an actuator 6, and circuitry 8.

In this exemplary embodiment, the test object W is made of, for example, a metal or a composite material such as carbon fiber reinforced plastic (CFRP). The thickness of the test object W is, for example, from about several mm to about 20 mm. For example, the test object W is, but not limited to, an aircraft fuselage. The test object W includes an opening H extending through the thickness of the test object W. The opening H is, for example, an opening located at a junction between two parts of the test object W. The diameter of the opening H is, for example, from 2 to 100 mm.

The ultrasonic sensor 1 applies ultrasound to the test object W, for example, from below the test object W. After applying the ultrasound, the ultrasonic sensor 1 receives the ultrasound reflected from the test object W. The circuitry 8 determines whether the test object W has a flaw based on the energy of the ultrasound received from the ultrasonic sensor 1.

The casing 2 has lower hardness than the test object W. The casing 2 is made of, for example, a resin. The casing 2 is filled with a contact medium B that allows the ultrasound to propagate therethrough. The contact medium B is, for example, a liquid such as water. The casing 2 holds the ultrasonic sensor 1 immersed in the contact medium B. Thus, the ultrasound emitted from the ultrasonic sensor 1 propagates through the contact medium B. The ultrasonic sensor 1 is secured to a later-described holding plate 2a of the casing 2 by means of fasteners such as screws. The capacity of the casing 2 is desirably as large as possible to disperse the load imposed on the contact medium B due to a pressure for supplying the contact medium B.

Figure 3:
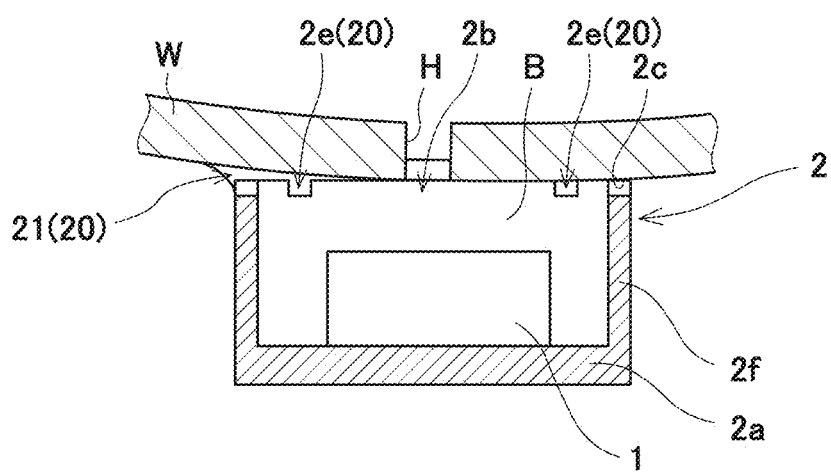
FIG. 3 is a cross-sectional view for illustrating a gap between a test object-contacting portion of a casing and a test object.
Figure 3:
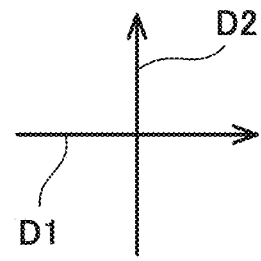

The casing 2 includes a holding plate 2a and a casing side wall structure 2f. The holding plate 2a extends horizontally. The casing side wall structure 2f includes four side walls extending vertically from the holding plate 2a. The casing 2 is shaped as a top-open container. The casing 2 further includes: a test object-contacting portion 2c and a test object-facing opening 2b. The test object-contacting portion 2c locates at the end of the casing side wall structure 2f, i.e. upper end, that faces toward the test object W. The test object-facing opening 2b faces away from the ultrasonic sensor 1. The test object-facing opening 2b is located inside the test object-contacting portion 2c. The test object-contacting portion 2c corresponds to a "surface including the test object-facing opening 2b". In this exemplary embodiment, the test object-contacting portion 2c is located in a horizontal plane. In some cases such as when the test object W is an aircraft fuselage, the test object W is not shaped as a flat plate. For example, as shown in FIG. 3, the test object W may be shaped to have a curvature in a direction in which the test object W extends. In this case, the casing 2 is brought into contact with the test object W at a part of the test object-contacting portion 2c, and there is a gap 21 between the rest of the test object-contacting portion 2c of the casing 2 and the test object W.

Figure 2:
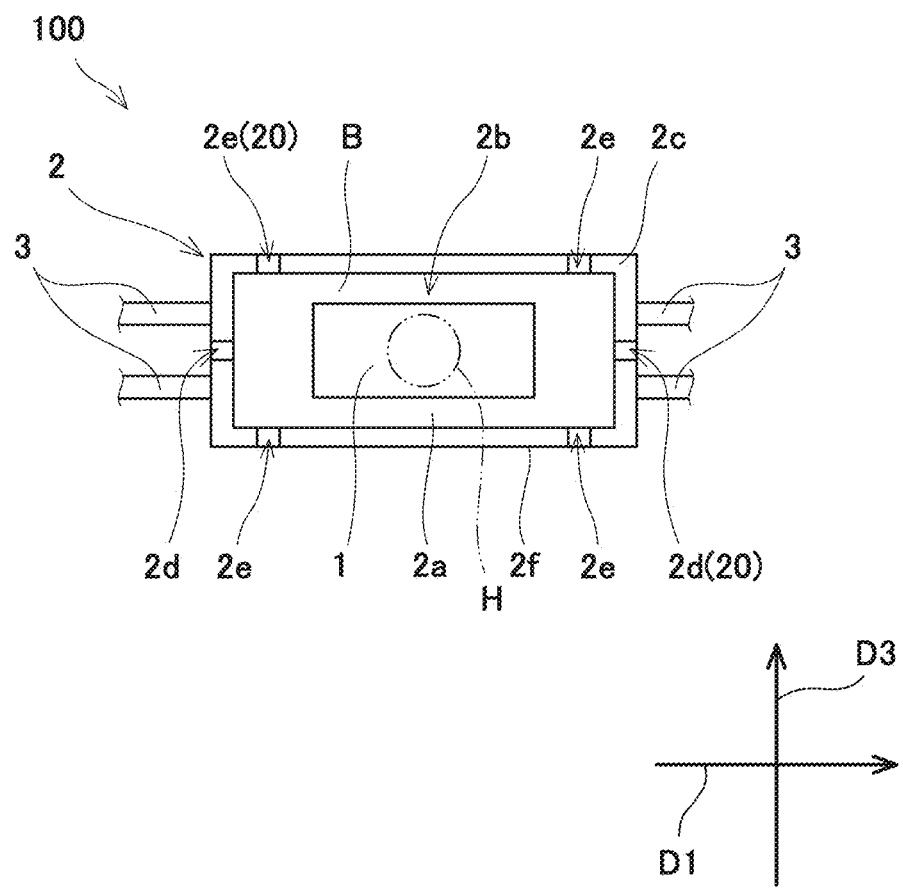
FIG. 2 is a partial plan view of the ultrasonic tester of FIG. 1.

The casing 2 is, for example, rectangular in plan as shown in FIG. 2. The four side walls of the casing side wall structure 2f of the casing 2 include grooves through which the contact medium B is discharged. Specifically, each of the two side walls of the casing side wall structure 2f that correspond to the short sides of the rectangular shape includes a groove 2d located at the top of the side wall. Each of the other two side walls corresponding to the long sides of the rectangular shape includes two grooves 2e located at the top of the side wall.

The grooves 2d and 2e are formed by cutting corresponding parts of the test object-contacting portion 2c of the casing side wall structure 2f downwardly into recesses. The contact medium B is discharged out of the casing 2 through the grooves 2d and 2e. As previously stated, at least a part of the test object-contacting portion 2c of the casing side wall structure 2f of the casing 2 is brought into contact with the test object W, and a gap 21 occurs between the rest of the test object-contacting portion 2c of the casing 2 and the test object W. Thus, the contact medium B is discharged outside also through the gap 21. The grooves 2d and 2e and the gap 21 are outlets and correspond to a discharge structure 20 through which the contact medium is discharged out of the casing 2.

Desirably, the presence or size of the gap 21 is controlled in view of the following points. To regulate the amount of the contact medium B to be discharged, it is preferable to eliminate or minimize the gap 21 which serves as an outlet other than the grooves 2d and 2e. However, pressing the casing 2 against the test object W so strongly as to eliminate the gap 21 could damage the surface or any other part of the test object W. Thus, the force with which the casing 2 is pressed against the test object W is controlled so as to avoid damage to the surface of the test object W while eliminating or minimizing the gap 21. Although the foregoing has described a concrete example of the configuration of the casing 2, the casing 2 is not limited to the above configuration. In FIG. 2, the test object W is omitted for intelligibility of the elements of the casing 2, and only the opening H of the test object W is indicated by a dashed-double dotted line. The discharge structure 20 of the ultrasonic tester 100 may include only one or some of the grooves 2d and 2e and the gap 21 which have been described above or may be constituted by elements different from the grooves 2d and 2e and the gap 21.

In this exemplary embodiment, the ultrasonic tester 100 includes a plurality of supply pipes 3. Specifically, referring to FIG. 1, four supply pipes 3 may be connected to the left wall of the casing side wall structure 2f of the casing 2, and four supply pipes 3 may be connected to the right wall of the casing side wall structure 2f. The contact medium B is supplied into the casing 2 through the supply pipes 3.

Each of the supply pipes 3 is equipped with a valve 4. The circuitry 8 controls the opening and closing of the valve 4 to start and stop supply of the contact medium B through a corresponding one of the supply pipes 3 and controls the opening degree of the valve 4 to adjust the flow rate of the contact medium B flowing through the corresponding supply pipe 3. Upstream of the location of the valve 4 on each of the supply pipes 3 there are a pump that delivers the contact medium B and a tank that stores the contact medium B.

In the case where the diameters of the supply pipes 3 are excessively small, the flow velocity of the contact medium B and therefore the pressure drop are high. Thus, the flow rate is lower than in the case where the pumps used are the same but the supply pipes 3 have greater diameters. It is desirable to take this into account when choosing the diameters of the supply pipes 3. In the case where the number of the supply pipes 3 is small, a flow rate higher than a certain level cannot be achieved. It is desirable to take this into account when choosing the number of the supply pipes 3. In the case where the supply pipes 3 are excessively long, the pressure drop is high, and the flow rate is lower than in the case where the pumps used are the same but the supply pipes 3 are shorter. It is desirable to take this into account when choosing the lengths of the supply pipes 3. The flow rate decreases also in the case where the pressure for supplying the contact medium B is low. In such a case, the pressure is desirably increased by the pump or any other means.

The mover 5 moves the casing 2 in a test direction D3 of the test object W as shown in FIG. 2. Thus, the ultrasonic sensor 1 held by the casing 2 is moved in the test direction D3 while emitting ultrasound. The test direction D3 intersects with the thickness direction of the test object W. In particular, the test direction D3 is orthogonal to the thickness direction of the test object W. Any known structure may be used as the mover 5. For example, the mover 5 may include an arm that holds the casing 2 and a linear actuator such as an air cylinder, a ball screw, or a motor coupled to the arm to reciprocate the arm in the test direction D3. The direction D1 is orthogonal to the test direction D3.

The actuator 6 is, for example, an air cylinder. The actuator 6 operates to lift that surface of the casing 2 which includes the test object-facing opening 2b, i.e., the test object-contacting portion 2c of the casing side wall structure 2f, in a pressing direction D2 perpendicular to the test direction D3. The pressing direction D2 is, for example, a vertically upward direction. Thus, the test object-contacting portion 2c of the casing side wall structure 2f is pressed against the test object W from below.

The circuitry 8 includes a CPU 8a, an HDD 8b, a ROM 8c, and a RAM 8d. Either or both the HDD 8b and the RAM 8d prestore the volume V of the opening H of the test object W. The HDD 8b and the RAM 8d serve as a memory. The volume V of the opening H of the test object W will be described later.

The circuitry 8 with the above configuration controls the supply rate of the contact medium B supplied through the supply pipes 3, the moving speed of the casing 2 moved by the mover 5, and the force with which the casing 2 is pressed against the test object W by the actuator 6. Hereinafter, the control performed by the circuitry 8 in this exemplary embodiment will be described in detail.

The flow rate of the contact medium B entering the opening H of the test object W from the casing 2 is denoted by z. The time taken for the test object-facing opening 2b of the casing 2 to pass the opening H during movement of the casing 2 in the test direction D3 is denoted by t. The volume of the opening H of the test object W is denoted by V. The circuitry 8 controls the supply rate of the contact medium B supplied through the supply pipes 3 and the moving speed of the casing 2 moved by the mover 5 such that z×t satisfies 0<z×t<V. This control performed by the circuitry 8 will be referred to as "intrusion-preventing control" hereinafter. Accordingly, the total amount z×t of the contact medium entering the opening H while the casing 2 is passing the opening H is controlled so as not to exceed the volume V of the opening H. Thus, the ultrasound echo is prevented from attenuating owing to water intruding into the test object and residing behind the part subjected to flaw detection, and good-quality flaw detection data can be obtained. Additionally, without attaching a seal to the opening H or fitting a jig into the opening H, contact medium doesn't intrude into the test object. Thus, the number of work steps can be reduced.

The upper limit of the total amount z×t of the contact medium is not limited to the above value and may be defined, for example, taking into account the surface tension of the contact medium B. The maximum volume of a portion of the contact medium B that can bulge from the opening H in a state where the interface between the portion of the contact medium B and outside air is kept inside the perimeter of the opening H under action of the surface tension of the contact medium B, is denoted by S. The circuitry 8 may control the supply rate of the contact medium B supplied through the supply pipes 3 and the moving speed of the casing 2 moved by the mover 5 such that the total amount z×t of the contact medium entering the opening H while the casing 2 is passing the opening H is less than V+S. In this case, there is a margin corresponding to the volume S. Thus, the control is easier than in the case where the total amount z×t is made less than V.

The flow rate z of the contact medium B entering the opening H of the test object W from the casing 2 is a value calculated by subtracting the discharge rate of the contact medium B discharged out of the casing 2 through the grooves 2d and 2e and the gap 21 from the supply rate of the contact medium B supplied into the casing 2 through the supply pipes 3.

The following pieces of information are prestored in the memory: the volume V; the volume S; data indicating the relationship between the supply rate of the contact medium B and the pump supply pressure; data indicating the relationship between the discharge rate of the contact medium B and the supply pressure; data indicating the relationship between the discharge rate of the contact medium B and the shape of and the pressing force on the test object W; and data indicating the relationship between the time t taken for the casing 2 to pass the opening H and the extent to which the mover 5 is operated. The supply rate and discharge rate of the contact medium B and therefore the flow rate z can be obtained from these pieces of information.

Specifically, the supply rate of the contact medium B can be obtained by detection of the pump supply pressure and based on the data indicating the relationship between the supply rate and the pump supply pressure. The discharge rate of the contact medium B discharged through the grooves 2d and 2e can be obtained by detection of the supply pressure and based on the data indicating the relationship between the discharge rate of the contact medium B and the supply pressure and on the sizes of the grooves 2d and 2e. In the case where an actuator including an air cylinder is used as the mover 5, the discharge rate of the contact medium B discharged through the gap 21 can be obtained by detection of the compressed air pressure applied to the air cylinder and based on the data indicating the relationship between the discharge rate of the contact medium B and the shape of and the pressing force on the test object W. The time t taken for the casing 2 to pass the opening H can be obtained by detection of the voltage or current of a servo motor driving the actuator and based on the data indicating the relationship between the time t and the extent to which the mover 5 is operated.

When executing the intrusion-preventing control, the circuitry 8 acquires the above parameters and controls the supply rate of the contact medium B and the moving speed of the casing 2 such that z×t satisfies 0<z×t<V. For z×t to satisfy 0<z×t<V, the circuitry 8 controls the actuator 6 such that the force with which the casing 2 is pressed against the test object W falls within a given range.

The volume V, the volume S, and the different kinds of data indicating the various relationships are not limited to being stored in the memory of the ultrasonic tester 100. They may be acquired from an external entity through a communication network or may be acquired from an external memory.

Although the foregoing has described the intrusion-preventing control performed by the circuitry 8, the configuration for implementing this control is not limited to that illustrated above. The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Variants

The present disclosure is not limited to the above embodiment, and various modifications as described below may be made without departing from the gist of the present disclosure.

Figure 4:
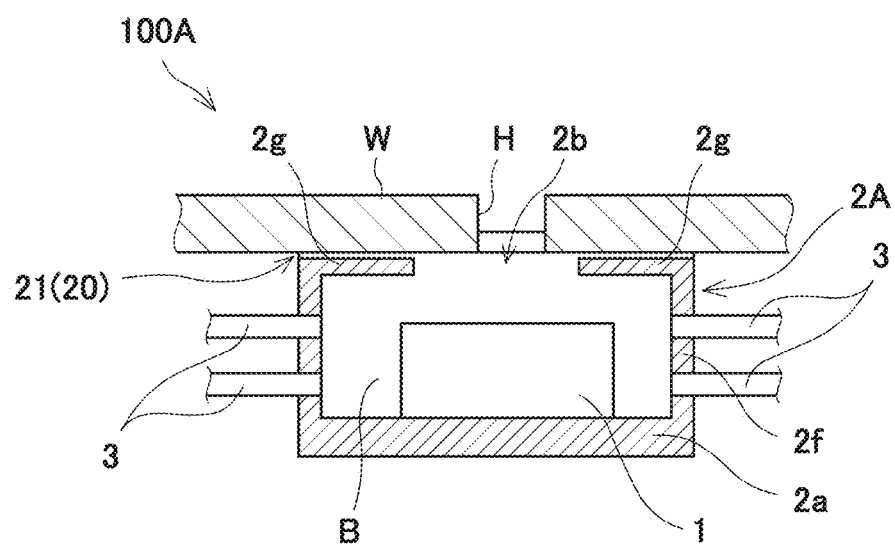
FIG. 4 is a cross-sectional view showing a variant of the ultrasonic tester of FIG. 1.
Figure 4:
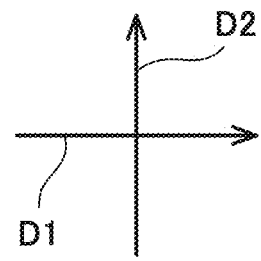

Although in the above embodiment the test object-contacting portion 2c is located at the end of the casing side wall structure 2f that faces toward the test object W, the portion of the casing 2 that is brought into contact with the test object W is not limited to such a test object-contacting portion 2c as described in the above embodiment. FIG. 4 is a cross-sectional view showing a variant of the ultrasonic tester of FIG. 1.

As shown in FIG. 4, a casing 2A of an ultrasonic tester 100A according to a variant includes a test object-contacting portion 2g. The test object-contacting portion 2g is located at the end of the casing side wall structure 2f that faces toward the test object W. The test object-contacting portion 2g extends inward from that end of the casing side wall structure 2f. In this configuration, the test object-contacting portion 2g can contact the test object W over a wider area than the test object-contacting portion 2c. Thus, the gap between the test object W and the casing 2A can be made smaller than the gap 21 shown in FIG. 3.

Although in the above embodiment the test object W may be an aircraft fuselage, the test object W is not limited to this type. Any of various machines and their components can be employed as the test object W. The cross-sectional shape of the test object W may be any of various shapes such as a flat shape, a U-shape, a T-shape, an I-shape, and an L-shape.

Although in the above embodiment there are a plurality of supply pipes 3, the ultrasonic tester 100 is not limited to including a plurality of supply pipes 3. For example, the ultrasonic tester 100 may include a single supply pipe 3 as long as a desired supply pressure and a desired supply rate can be achieved.

Although in the above embodiment the casing 2 is made of a resin to have lower hardness than the test object W, the casing 2 is not limited to being made of any resin. The casing 2 may be made of any other kind of material that allows the casing 2 to have lower hardness than the test object W and have wear resistance.

An ultrasonic tester of the present disclosure is an ultrasonic tester that applies ultrasound to a test object having an opening to detect whether the test object has a flaw, the ultrasonic tester including: an ultrasonic sensor that applies the ultrasound to the test object; a casing that holds the ultrasonic sensor immersed in a contact medium that allows the ultrasound to propagate therethrough, the casing including a test object-facing opening; a mover that moves the casing in a test direction of the test object; and circuitry configured to, when the test object-facing opening of the casing moved by the mover is passing the opening of the test object in the test direction, control a moving speed of the casing such that a region of contact between the test object and the contact medium entering the opening of the test object is kept within the opening of the test object.

In accordance with the present disclosure, the circuitry controls the moving speed of the casing moved by the mover such that a region of contact between the test object and the contact medium entering the opening of the test object is kept within the opening of the test object. Thus, water intrusion into the test object through the opening of the test object can be prevented. This eliminates the conventional steps of attaching a seal to the opening or fitting a jig into the opening and removing the seal or jig. As the test object does not have any part that cannot be subjected to flaw detection due to an obstacle such as an attached seal, additionally manual flaw detection for such a part is eliminated.

In the above disclosure, the circuitry may be configured to control a supply rate of the contact medium and the moving speed of the casing moved by the mover such that z×t satisfies 0<z×t<V, wherein z is a flow rate of the contact medium entering the opening of the test object, t is a time taken for the test object-facing opening of the casing to pass the opening of the test object in the test direction, and V is a volume of the opening of the test object. According to an implementation, the moving speed of the casing is controlled to be greater than zero. In the above disclosure, the ultrasonic tester may further include a supply pipe through which the contact medium is supplied into the casing, and the circuitry may be configured to control the supply rate of the contact medium and the moving speed of the casing moved by the mover such that z×t satisfies 0<z×t<V+S, wherein S is a maximum volume of a portion of the contact medium that can bulge from the opening of the test object in a state where an interface between the portion of the contact medium and outside air is kept inside a perimeter of the opening of the test object under action of a surface tension of the contact medium.

In the above configuration, the circuitry controls the supply rate of the contact medium and the moving speed of the casing such that z×t satisfies 0<z×t<V or 0<z×t<V+S. In this case where the control by the circuitry is carried out with refinement of the requirement to be satisfied, water intrusion into the test object through the opening of the test object can be prevented very reliably.

In the above disclosure, the ultrasonic tester may further include a discharge structure through which the contact medium is discharged out of the casing, and the circuitry may be configured to, when controlling the supply rate of the contact medium and the moving speed of the casing moved by the mover, calculate the flow rate z by subtracting a flow rate of the contact medium discharged through the discharge structure from the supply rate of the contact medium supplied through the supply pipe.

In the above configuration, the supply rate of the contact medium and the moving speed of the casing moved by the mover can be controlled based on the accurately calculated flow rate z.

In the above disclosure, the ultrasonic tester may further include an actuator that presses a surface of the casing against the test object, the surface including the test object-facing opening, the discharge structure may include outlets through which the contact medium is discharged, at least one of the outlets may be a gap between the casing and the test object, and the circuitry may be configured to control the actuator to reduce the gap between the test object and the casing.

In the above configuration, attention is drawn to the fact that in most flaw detection processes there is a gap between a part of the casing and the test object, and the flow rate of the contact medium discharged out of the casing through the gap is taken into account in the calculation of the flow rate z. This allows for more accurate calculation of the flow rate z. Additionally, the pressing force of the casing on the test object is controlled within a given range, and thus the gap can be minimized while slightly deforming the test object.

In the above disclosure, the ultrasonic tester may further include a valve that increases or decreases the supply rate of the contact medium supplied through the supply pipe, and the circuitry may be configured to control the supply rate of the contact medium by adjusting an opening degree of the valve.

In the above configuration, intrusion of the contact medium through the opening of the test object can be avoided in the event that the amount of the contact medium supplied is greater than necessary.

In the above disclosure, the casing may have lower hardness than the test object.

In the above configuration, damage to the test object, e.g., scratches on the test object, can be avoided in the event that the casing is pressed against the test object with a given force by the actuator.

In the above disclosure, the casing may be made of a resin.

In the above configuration, where the casing is made of a resin, damage to the test object, e.g., scratches on the test object, caused by the pressing of the casing against the test object can be avoided, and the cost for the casing can be reduced. Additionally, the casing made of a resin can slide on the test object smoothly thanks to reduced friction. In this case, the slidability can be further improved by adjusting the surface roughness of the resin surface.

What is claimed is:

1. An ultrasonic device, comprising:
    an ultrasonic sensor that applies ultrasound to a test object;
    a casing that holds the ultrasonic sensor to be immersed in a contact medium that allows the ultrasound to propagate therethrough, the casing including a test object-facing opening; and
    circuitry configured to, when the test object-facing opening of the casing is passing an opening of the test object in a test direction of the test object, control a moving speed of the casing such that a region of contact between the test object and the contact medium entering the opening of the test object is kept within the opening of the test object.

2. The ultrasonic device according to claim 1, wherein:
    the circuitry is configured to control a supply rate of the contact medium and the moving speed of the casing such that z×t satisfies 0<z×t<V, wherein z is a flow rate of the contact medium entering the opening of the test object, t is a time taken for the test object-facing opening of the casing to pass the opening of the test object in the test direction, and V is a volume of the opening of the test object.

3. The ultrasonic device according to claim 2, further comprising:
    a supply pipe through which the contact medium is supplied into the casing,
    wherein the circuitry is configured to control the supply rate of the contact medium and the moving speed of the casing such that z×t satisfies 0<z×t<V+S, wherein S is a maximum volume of a portion of the contact medium that can bulge from the opening of the test object in a state where an interface between the portion of the contact medium and outside air is kept inside a perimeter of the opening of the test object under action of surface tension of the contact medium.

4. The ultrasonic device according to claim 3, further comprising:
    a discharge structure through which the contact medium is discharged out of the casing,
    wherein the circuitry is configured to, when controlling the supply rate of the contact medium and the moving speed of the casing, calculate the flow rate z by subtracting a flow rate of the contact medium discharged through the discharge structure from the supply rate of the contact medium supplied through the supply pipe.

5. The ultrasonic device according to claim 4, further comprising:
    an actuator that presses a surface of the casing against the test object, the surface including the test object-facing opening,
    wherein:
    the discharge structure includes outlets through which the contact medium is discharged,
    at least one of the outlets is a gap between the casing and the test object, and
    the circuitry is configured to control the actuator to reduce the gap between the test object and the casing.

6. The ultrasonic device according to claim 3, further comprising:
    a valve that increases or decreases the supply rate of the contact medium supplied through the supply pipe,
    wherein the circuitry is configured to control the supply rate of the contact medium by adjusting an opening degree of the valve.

7. The ultrasonic device according to claim 1, wherein the casing has lower hardness than the test object.

8. The ultrasonic device according to claim 1, wherein the casing is made of a resin.

9. The ultrasonic device according to claim 1, further comprising:
    a mover, controlled by the circuitry, to move the case in a test direction of the test object.

10. The ultrasonic device according to claim 9, wherein the mover comprises:
    an arm that holds the casing and an actuator.

11. The ultrasonic device according to claim 10, wherein:
    the actuator includes at least one of a linear actuator, an air cylinder, a ball screw, or a motor coupled to the arm.

12. A method, comprising:
    sensing a test object through an opening of a casing, the casing holding a contact medium; and
    controlling a moving speed of the casing such that a region of contact between the test object and the contact medium entering an opening of the test object is kept within the opening of the test object.

13. The method according to claim 12, further comprising:
    control a supply rate of the contact medium and the moving speed of the casing such that z×t satisfies 0<z×t<V, wherein z is a flow rate of the contact medium entering the opening of the test object, t is a time taken for the opening of the casing to pass the opening of the test object in a test direction of the test object, and V is a volume of the opening of the test object.

14. The method according to claim 13, further comprising:
    control the supply rate of the contact medium and the moving speed of the casing such that z×t satisfies 0<z×t<V+S, wherein S is a maximum volume of a portion of the contact medium that can bulge from the opening of the test object in a state where an interface between the portion of the contact medium and outside air is kept inside a perimeter of the opening of the test object under action of surface tension of the contact medium.

15. The method according to claim 14, further comprising:
   calculating the flow rate z by subtracting a flow rate of the contact medium discharged through the discharge structure from the supply rate of the contact medium supplied through a pipe, when controlling the supply rate of the contact medium and the moving speed of the casing.

16. The method according to claim 15, further comprising:
   controlling an actuator to reduce gap between the test object and the casing.

17. The method according to claim 14, further comprising:
   controlling the supply rate of the contact medium by adjusting an opening degree of a valve.

18. The method according to claim 12, wherein:
   the casing has lower hardness than the test object.

19. The method according to claim 12, wherein the casing is made of a resin.

20. The method according to claim 12, wherein:
   the controlling the moving speed controls the moving speed to be greater than zero.

* * * * *